… [54] POLYMERS CONTAINING AROMATIC ALDEHYDE GROUPS

[75] Inventors: Herbert Naarmann, Wattenheim; Guenter Wulff, Alfter-Impekoven, both of Fed. Rep. of Germany; Ahmed Akelah, Kafer el Zyat, Egypt

[73] Assignee: BASF Aktiengesellschaft, Fed. Rep. of Germany

[21] Appl. No.: 93,931

[22] Filed: Nov. 13, 1979

[30] Foreign Application Priority Data

Nov. 11, 1978 [DE] Fed. Rep. of Germany ....... 2848967

[51] Int. Cl.³ ............................................. C08F 16/34
[52] U.S. Cl. ........................ 526/89; 526/208; 526/209; 526/220; 526/271; 526/279; 526/304; 526/313; 526/315
[58] Field of Search ............... 526/279, 313, 315, 304, 526/305, 326, 89, 208, 209, 220, 271, 303

[56] References Cited

U.S. PATENT DOCUMENTS

| | | | |
|---|---|---|---|
| 2,938,883 | 5/1960 | Raich | 526/326 |
| 3,450,615 | 6/1969 | Eldred et al. | 526/315 |
| 3,641,217 | 2/1972 | Agolini | 526/304 |
| 3,933,753 | 1/1976 | Kuntz et al. | 526/315 |

OTHER PUBLICATIONS

W. J. Dale et al., J. Org. Chem. 26 (1961), pp. 2225–2227.
A. H. Ahlbrecht et al., J.A. Chem. Soc., 75 (1953), p. 984.
C. E. Rehberg et al., JACS, 72 (1950) pp. 5199–5200.

Primary Examiner—Harry Wong, Jr.
Attorney, Agent, or Firm—Keil & Witherspoon

[57] ABSTRACT

Abstract of the disclosure: Novel polymers which have K values of from 20 to 140 and which contain structural units of the general formula

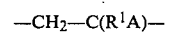

where $R^1$ is H or $CH_3$ and A is an aromatic radical which contains aldehyde groups and has the formula

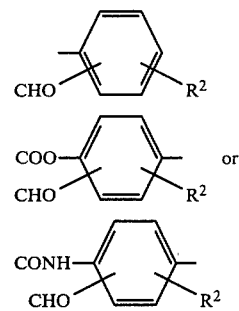

where $R^2$ is H, OH, O-alkyl, alkoxyalkyl or O—Si(CH$_3$)$_3$. The polymers are prepared by polymerizing the corresponding monomers $CH_2=C(R^1A)$ in the presence of free-radical initiators.

18 Claims, No Drawings

POLYMERS CONTAINING AROMATIC ALDEHYDE GROUPS

The present invention relates to novel polymers which have K values of from 20 to 140.

It is an object of the present invention to provide polymers which contain aldehyde groups bonded to aromatic radicals.

We have found that this object is achieved by providing polymers which have K values of from 20 to 140 and contain structural units of the general formula (I):

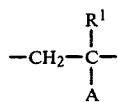

where $R^1$ is H or $CH_3$ and A is

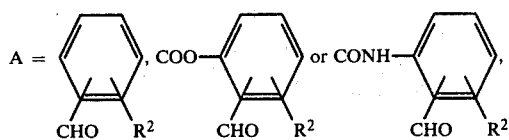

where $R^2$ is H, OH, O-alkyl, alkoxyalkyl or O—$Si(CH_3)_3$.

The polymers may be either homopolymers with recurring units of the general formula (I) or copolymers which contain units of the formula (I) and other copolymerized structural units derived from one or more copolymerizable olefinically unsaturated compounds.

Polymers where $R^2$ is H, OH, $OCH_3$, $OSi(CH_3)_3$ or $CH_2OCH_3$ are preferred.

Amongst copolymers, those which contain styrene or an acrylic acid ester as a copolymerized olefinically unsaturated compound are preferred.

For the purposes of the invention, polymers which have K values of from 20 to 140 and which contain structural units of the general formula (I) are oligomeric or macromolecular materials which consist entirely or substantially or partially of recurring units of the formula

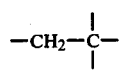

where the structure $$-CH_2-\underset{|}{\overset{|}{C}}-$$

is a part of the polymer chain. The polymers contain, as substituents of the main chain, the radical $R^1$, and the side branch A defined above. Accordingly, the polymers may be homopolymers which only contain the structural elements (I) above, as well as copolymers which additionally contain copolymerized olefinically unsaturated compounds.

The K value of the polymer is the parameter conventionally used to characterize the degree of polymerization. The K values of the polymers according to the invention were determined by the method of H. Fikentscher, Cellulosechemie 13 (1932), 58–64 and 71–74, using a one percent strength solution in dimethylformamide at 25° C.; $K = k \cdot 10^3$.

The polymers according to the invention are prepared by homopolymerization of a compound (II)

where $R^1$ and A have the above meanings, or by copolymerization of a compound of the general formula (II) with one or more olefinically unsaturated monomers copolymerizable with (II), in the presence of a free-radical initiator.

The compounds of the formula (II) are known per se and are prepared by the methods described by R. Stoemer and K. Behn, Ber. dtsch. Chem. Ges, 34 (1901), 2455 to 2460, or W. J. Dale et al., J. Org. Chem. 26 (1961), 2225–2227 or A. H. Ahlbrecht and D. W. Codding, J. Amer. Chem. Soc. 75 (1953), 984 or C. E. Rehberg et al., J. Amer. Chem. Soc. 72 (1950), 5199–5200.

The compounds III to XII are particularly suitable olefinically unsaturated monomers of category (II)

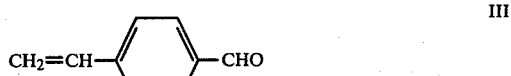

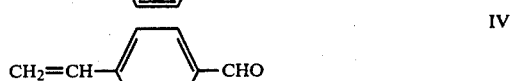

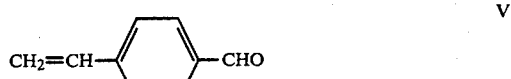

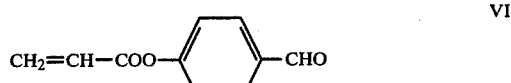

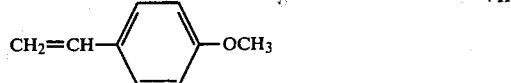

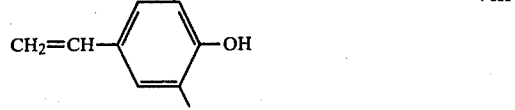

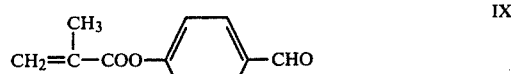

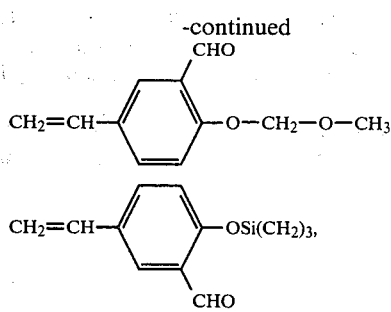

amongst which compound VIII is the most suitable.

The monomers of the formula II can each be homopolymerized. Of course, it is also possible to copolymerize mixtures of different compounds II. In addition, the compounds are capable of copolymerization with other olefinically unsaturated monomers.

Examples of suitable olefinically unsaturated comonomers which may be copolymerized with the compounds of the formula II are olefins, eg. ethylene, propylene, butadiene and isoprene; styrene and substituted styrenes, eg. α-methylstyrene, p-chlorostyrene and p-methylstyrene; esters of acrylic acid and of methacrylic acid, eg. of methanol, ethanol, butanol or ethylcyclohexanol, of ethyleneglycol, of 1,2-propyleneglycol, of 1,3-butyleneglycol or of 1,4-butyleneglycol; acrylamide and methacrylamide and substituted amides, eg. N-methylolacrylamide and its ethers, eg. N-methylolacrylamide butyl ether and N-methylolmethacrylamide methyl ether; acrylonitrile and methacrylonitrile; vinyl esters, eg. vinyl acetate and vinyl propionate; vinyl ethers, eg. methyl vinyl ether, ethyl vinyl ether or alkyl vinyl ethers where alkyl is of 3 to 6 carbon atoms; fumaric acid, maleic acid, itaconic acid and esters of these acids, and maleic anhydride. Two or more of the above compounds may also be copolymerized simultaneously with the above monomers according to formula II.

In preparing copolymers, the proportion of olefinically unsaturated aromatic aldehyde derivatives (II) in the monomer mixture may vary within wide limits, for example from 1 to 99, especially from 5 to 80, preferably from 8 to 60, % by weight based on the total weight of monomers.

Conventional free-radical initiators are used to start the polymerization. Examples of suitable initiators are hydrogen peroxide, organic hydroperoxides and peroxides, eg. caproyl peroxide, lauroyl peroxide, t-butyl perbenzoate, dicumyl peroxide, p-menthane hydroperoxide, cumene hydroperoxide, succinic acid peroxide, and aliphatic azo compounds which decompose to free radicals under polymerization conditions, eg. 2,2'-azo-bis-2,4-dimethylvaleronitrile, 2,2'-azo-bis-isobutyronitrile and analogous azonitriles, listed, for example, in J. Hine, Reaktivität und Mechanismus in der organischen Chemie, Verlag Georg-Thieme, Stuttgart (1960), page 412, as well as conventional Redox catalyst systems, such as systems comprising potassium persulfate or ammonium persulfate and ascorbic acid, sodium hydrosulfite or iron-II salts.

The chelates, known to form free radicals, of transition metals, eg. chelates of manganese(III), cobalt(III), copper(II) and cerium(IV), may also be used. In general, 1,3-dicarbonyl compounds are used as chelating agents. Examples which may be mentioned are manganese(III) acetylacetonate and cobalt(III) ethyl acetoacetate. Furthermore, the polymerization may be initiated by radiation, in the presence or absence of a sensitizer, eg. a benzoin derivative.

The initiator is in general used in an amount of from 0.05 to 5% by weight, preferably from 0.1 to 1.0% by weight, based on the amount of monomer. The optimum amount, and the most effective initiator, can readily be established by experiment. The polymerization can be carried out in bulk. Advantageously, however, it is carried out in the presence of a solvent or diluent. Examples of suitable solvents or diluents are ketones, eg. methyl ethyl ketone and methyl propyl ketone, ethers, eg. diethyl ether, tetrahydrofuran or dioxane, and aliphatic, cycloaliphatic or aromatic hydrocarbons, eg. hexane, heptane, cyclohexane, benzene or toluene; dimethylformamide is also very suitable.

The suspension or solution polymerization processes conventionally used for a plurality of other monomers or monomer mixtures are also suitable for the novel process. The novel process also does not differ from conventional processes in respect of the assistants which may or may not be used, eg. dispersants, protective colloids and the like.

The polymerization can be carried out over a wide temperature range, from about 0° to 150° C., preferably from 50° to 120° C., with reaction times of from 1 to 20 hours, preferably from 2 to 10 hours. In general, the polymerization is carried out under atmospheric pressure, but superatmospheric pressure may also be used. The latter is particularly indicted where copolymerizations with low-boiling comonomers are concerned, in order to ensure an adequate concentration of the comonomer in the reaction mixture.

The copolymerization of the olefinically unsaturated compounds (II) with ethylene or butadiene is advantageously carried out in an aliphatic or aromatic solvent, by introducing the mutually copolymerizable monomers into the solvent, which contains an initiator, and carrying out the polymerization under superatmospheric pressure, which may be up to about 2,000 atmospheres where ethylene is a comonomer.

The copolymerization with acrylic acid esters is advantageously carried out in an aromatic or aliphatic hydrocarbon under the conventional conditions for the polymerization of acrylic acid esters.

By virtue of the aldehyde group, with or without ether groups in the side chain, these polymers are reactive and may undergo further reactions or are easily crosslinkable. For example, the polymers may be intermolecularly crosslinked, or may be graft-polymerized or vulcanized. It is also possible to modify the aldehyde group by suitable optically active reactants, eg. methyl esters of aminoacids.

The polymers according to the invention have K values of from 20 to 140, preferably from 50 to 90. They are used, for example, to produce moldings, high-impact materials, coatings or adhesives, for which purposes they may also be used as mixtures with other plastics, eg. with polyethylene, polypropylene or vinyl acetate/ethylene copolymers. Because of their surfactant properties, the polymers may, inter alia, also be used for the resin-finishing of paper and textiles.

Since the polymers containing aldehyde groups may also be modified to give optically active polymers, these products are also used as packings for columns for the separation of racemates.

In the Examples which follow, parts are by weight.

EXAMPLE 1

Polymerization of vinylsalicylaldehyde (VSA)

0.01 part of azodiisobutyronitrile and 2 parts of benzene are added to 1 part of VSA and after flushing with argon the mixture is heated under pressure at 80° C. for 24 hours, whereupon a further 0.01 part of azodiisobutyronitrile is added and the mixture is heated for 24 hours at 100° C. 0.5 part of a polymer having a K value of 20 is obtained.

EXAMPLE 2

Polymerization of 5-vinyl-2-methoxy-benzaldehyde (VMBA)

VMBA was polymerized similarly to the process described for VSA in Example 1. 0.98 part of a polymer having a K value of 37 was obtained.

EXAMPLE 3

Polymerization of 5-vinyl-2-trimethylsiloxy-benzaldehyde (VTBA)

VTBA was polymerized similarly to the process described for VSA in Example 1. 0.6 part of a polymer having a K value of 24 was obtained.

EXAMPLE 4

Preparation of a macroporous polymer 1 part of VMBA and 1 part of VTBA were copolymerized similarly to the process described for VSA in Example 1. 1.85 parts of a polymer having a K value of 35 were obtained. The copolymer, which contains 58% by weight of copolymerized VSTA units, is insoluble in dimethylformamide, toluene and other conventional solvents.

In the form of a powder, it may be used as an insoluble column packing.

EXAMPLE 5

Poly(acrylic acid m-formylphenylamide)

70 parts of dimethylformamide and 0.5 part of azodiisobutyronitrile are added to 30 parts of acrylic acid m-formylphenylamide (compound X) (melting point 78° C.) and the mixture is heated, and polymerized, for 5 hours at 80° C. After stripping off the solvent and degassing the mixture (for 2 hours at 120° C. under 0.1 mm Hg) 23 parts of a polymer having a K value of 49 are obtained.

EXAMPLE 6

Poly(p-formylphenyl methacrylate)

70 parts of toluene and 0.5 part of azodiisobutyronitrile are added to 30 parts of p-formylphenyl methacrylate (compound IX) (boiling point 143° C./0.5 mm Hg) and the mixture is heated, and polymerized, for 5 hours at 80° C. After stripping off the solvent and degassing the mixture 21 parts of a polymer having a K value of 43.5 are obtained.

We claim:

1. A polymer which has a K value of from 20 to 140 and which contains structural units of the general formula (I)

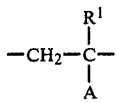

where $R^1$ is H or $CH_3$ and A is

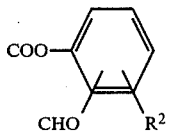

where $R^2$ is H, OH, O-alkyl, alkoxyalkyl or $O-Si(CH_3)_3$.

2. A process for the preparation of a polymer which has a K value of from 20 to 140 and which contains structural units of the general formula (I)

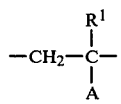

where $R^1$ is H or $CH_3$ and A is

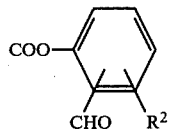

where $R^2$ is H, OH, O-alkyl, alkoxyalkyl or $O-Si(CH_3)_3$, wherein the corresponding unsaturated compound of the formula (II)

is polymerized, or copolymerized with other olefinically unsaturated monomers, in the presence of a free-radical initiator.

3. The process set forth in claim 2, wherein said unsaturated compound of the formula (II) is copolymerized with at least one other olefinically unsaturated monomer selected from the group consisting of olefins, styrene and substituted styrenes, acrylamide and methacrylamide and substituted amides, vinyl esters, fumaric acid, maleic acid, itaconic acid and esters of these acids, and maleic anhydride.

4. The process set forth in claim 3, wherein the proportion of unsaturated compound of the formula (II) in the monomer mixture varies from 8% to 60% by weight based on the total weight of monomers.

5. The process set forth in claim 2, wherein said polymerization or copolymerization is carried out in the presence of a solvent or diluent selected from the group consisting of ketones, ethers, aliphatic, cycloaliphatic or aromatic hydrocarbons, and dimethylformamide.

6. The process set forth in claim 2, wherein said polymerization is carried out at a temperature from about 50° to 120° C., for from about 2 to 10 hours.

7. The process set forth in claim 2, wherein said unsaturated compound of the formula (II) is copolymerized with ethylene or butadiene in an aliphatic or aromatic solvent under superatmospheric pressure.

8. The process set forth in claim 1, wherein said K value is from 50 to 90.

9. The process set forth in claim 2, wherein said unsaturated compound of the formula (II) is copolymerized with at least one other olefinically unsaturated monomer selected from the group consisting of styrene and acrylic acid esters.

10. A polymer which has a K value of from 20 to 140 and which contains structural units of the general formula (I)

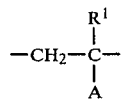 (I)

where $R^1$ is H or $CH_3$ and A is

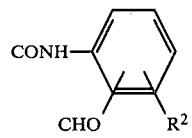

where $R^2$ is H, OH, O-alkyl, alkoxyalkyl or O—Si(CH$_3$)$_3$.

11. A process for the preparation of a polymer which has a K value of from 20 to 140 and which contains structural units of the general formula (I)

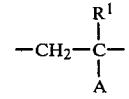 (I)

where $R^1$ is H or $CH_3$ and A is

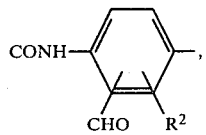

where $R^2$ is H, OH, O-alkyl, alkoxyalkyl or O—Si(CH$_3$)$_3$, wherein the corresponding unsaturated compound of the formula (II)

is polymerized, or copolymerized with other olefinically unsaturated monomers, in the presence of a free-radical initiator.

12. The process set forth in claim 11, wherein said unsaturated compound of the formula (II) is copolymerized with at least one other olefinically unsaturated monomer selected from the group consisting of olefins, styrene and substituted styrenes, acrylamide and methacrylamide and substituted amides, vinyl esters, fumaric acid, maleic acid, itaconic acid and esters of these acids, and maleic anhydride.

13. The process set forth in claim 12, wherein the proportion of unsaturated compound of the formula (II) is the monomer mixture varies from 8% to 60% by weight based on the total weight of monomers.

14. The process set forth in claim 11, wherein said polymerization or copolymerization is carried out in the presence of a solvent or diluent selected from the group consisting of ketones, ethers, aliphatic, cycloaliphatic or aromatic hydrocarbons, and dimethylformamide.

15. The process set forth in claim 11, wherein said polymerization is carried out at a temperature from about 50° to 120° C., for from about 2 to 10 hours.

16. The process set forth in claim 11, wherein said unsaturated compound of the formula (II) is copolymerized with ethylene or butadiene in an aliphatic or aromatic solvent under superatmospheric pressure.

17. The process set forth in claim 10, wherein said K value is from 50 to 90.

18. The process set forth in claim 11, wherein said unsaturated compound of the formula (II) is copolymerized with at least one other olefinically unsaturated monomer selected from the group consisting of styrene and acrylic acid esters.

* * * * *